(12) United States Patent
Baasch et al.

(10) Patent No.: US 10,359,061 B2
(45) Date of Patent: *Jul. 23, 2019

(54) ELECTRO-HYDRAULIC ACTUATOR

(71) Applicant: AVENTICS CORPORATION, Lexington, KY (US)

(72) Inventors: Oswaldo Baasch, Bowling Green, KY (US); Glenn Wethington, Oakland, KY (US); Jon A. Bigley, Bowling Green, KY (US)

(73) Assignee: Aventics Corporation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,904

(22) Filed: Feb. 7, 2018

(65) Prior Publication Data

US 2018/0238356 A1 Aug. 23, 2018

Related U.S. Application Data

(63) Continuation of application No. 14/471,410, filed on Aug. 28, 2014, now Pat. No. 9,897,114.
(Continued)

(51) Int. Cl.
*F16K 1/22* (2006.01)
*F15B 11/10* (2006.01)
(Continued)

(52) U.S. Cl.
CPC ............ *F15B 15/12* (2013.01); *F15B 15/149* (2013.01); *F15B 15/1485* (2013.01); *F16K 1/22* (2013.01);
(Continued)

(58) Field of Classification Search
CPC .. F16K 31/1635; F15B 15/12; F15B 15/1485; F15B 15/149; F15B 15/2815;
(Continued)

(56) References Cited

U.S. PATENT DOCUMENTS 704,654 A 7/1902 Moffitt et al.
1,535,212 A 4/1925 Egloff et al.
(Continued)

FOREIGN PATENT DOCUMENTS

DE 102008004768 A1 7/2009
EP 248986 A1 3/1987
(Continued)

OTHER PUBLICATIONS

Notification of Transmittal of the International Search Report and the Written Opinion of the International Searching Authority, or the Declaration; International Patent Application No. PCT/US2014/053108; Vectro Horizon Technologies, LLC (Baasch, Oswaldo, et al); dated Dec. 18, 2014.
(Continued)

*Primary Examiner* — Eric Keasel
(74) *Attorney, Agent, or Firm* — Marshall, Gerstein & Borun LLP

(57) ABSTRACT

This present invention relates to a remote electro-hydraulic actuator for actuating of mechanical devices, such as a valve in an internal combustion exhaust pipe. The actuator includes a multi-vane rotational assembly that flows the working fluid through strategically sized flow channels within the structure of the rotational assembly. The size of the holes are sized to help the stability of the valve and can also be provided with pressure check valves or reed valves to dampen the rotation of the valve and reduce any instabilities due to pulsations driven back via the output shaft.

22 Claims, 10 Drawing Sheets

Related U.S. Application Data

(60) Provisional application No. 61/871,564, filed on Aug. 29, 2013.

(51) Int. Cl.
| | |
|---|---|
| *F15B 15/12* | (2006.01) |
| *F15B 15/14* | (2006.01) |
| *F15B 15/20* | (2006.01) |
| *F15B 15/22* | (2006.01) |
| *F15B 15/28* | (2006.01) |
| *F16K 27/02* | (2006.01) |
| *F16K 31/54* | (2006.01) |
| *F16K 31/163* | (2006.01) |

(52) U.S. Cl.
CPC ...... *F16K 27/0218* (2013.01); *F16K 31/1635* (2013.01); *F16K 31/54* (2013.01); *F15B 11/10* (2013.01); *F15B 15/202* (2013.01); *F15B 15/204* (2013.01); *F15B 15/22* (2013.01); *F15B 15/2815* (2013.01); *F15B 2211/40507* (2013.01); *F15B 2211/50518* (2013.01); *F15B 2211/6313* (2013.01); *F15B 2211/7653* (2013.01); *F15B 2211/7656* (2013.01)

(58) Field of Classification Search
CPC ...... F15B 15/204; F15B 15/202; F15B 15/22; F15B 2211/7656; F15B 2211/7653; F15B 2211/6313; F15B 2211/50518; F15B 2211/40507; F15B 11/10
See application file for complete search history.

(56) References Cited

U.S. PATENT DOCUMENTS

| | | | |
|---|---|---|---|
| 2,900,995 A | 8/1959 | Dickerson et al. |
| 2,951,470 A | 9/1960 | Self |
| 2,960,076 A | 11/1960 | Henry |
| 2,984,221 A | 5/1961 | Van Voorhees |
| 3,155,019 A | 11/1964 | Stiglic et al. |
| 3,181,437 A | 5/1965 | Rumsey et al. |
| 3,279,329 A | 10/1966 | Floer |
| 3,426,652 A | 2/1969 | Blake |
| 4,295,836 A | 10/1981 | Kumm |
| 4,697,615 A | 10/1987 | Tsuchimoto et al. |
| 4,825,754 A | 5/1989 | Davaud et al. |
| 5,077,330 A | 4/1991 | Scobie et al. |
| 5,440,970 A | 8/1995 | Tonsor |
| 5,492,091 A | 2/1996 | Russ |
| 5,809,955 A | 9/1998 | Murata et al. |
| 5,813,316 A | 9/1998 | Sekiya et al. |
| 5,839,346 A | 11/1998 | Sekiya et al. |
| 5,893,782 A | 11/1999 | Lebrun et al. |
| 6,181,034 B1 | 1/2001 | Reichel et al. |
| 6,184,598 B1 | 2/2001 | Reichel et al. |
| 6,237,466 B1 | 5/2001 | Fukuhara et al. |
| 6,318,701 B1 | 11/2001 | Gardner |
| 6,332,439 B2 | 12/2001 | Sekiya et al. |
| 6,415,776 B1 | 7/2002 | Gates et al. |
| 6,422,216 B1 | 7/2002 | Lyko et al. |
| 6,422,217 B1 | 7/2002 | Feucht et al. |
| 6,484,675 B2 | 11/2002 | Pierik |
| 6,511,040 B2 | 1/2003 | Gardner |
| 6,601,821 B2 | 8/2003 | Tyler |
| 6,843,239 B2 | 1/2005 | Fensom et al. |
| 6,868,841 B2 | 3/2005 | Ieda |
| 6,907,868 B2 | 6/2005 | Veinotte |
| 6,928,994 B2 | 8/2005 | Veinotte |
| 6,935,320 B2 | 8/2005 | Veinotte |
| 6,948,483 B2 | 9/2005 | Veinotte |
| 6,983,760 B2 | 1/2006 | Lee |
| 7,201,159 B2 | 4/2007 | Veinotte |
| 7,419,134 B2 | 9/2008 | Gruel |
| 7,866,253 B2 | 1/2011 | Böttger et al. |
| 8,499,555 B2 | 8/2013 | Wolk et al. |
| 8,726,787 B2 | 5/2014 | Glynn et al. |
| 9,897,114 B2 | 2/2018 | Baasch et al. |
| 2012/0237379 A1 | 9/2012 | Glynn et al. |
| 2012/0313025 A1 | 12/2012 | Takai et al. |
| 2013/0283815 A1 | 10/2013 | Simpson |
| 2016/0252190 A1 | 9/2016 | Baasch et al. |
| 2017/0211722 A1 | 7/2017 | Hasegawa et al. |

FOREIGN PATENT DOCUMENTS

| | | |
|---|---|---|
| EP | 0774586 B1 | 5/1997 |
| EP | 1350960 A1 | 10/2003 |
| EP | 1628019 A2 | 2/2006 |
| GB | 1006690 | 10/1965 |

OTHER PUBLICATIONS

Supplementary Partial European Search Report; European Patent Application No. EP14840920; Vector Horizon Technologies, LLC (Baasch, Oswaldo, et al); dated Mar. 20, 2017.

US 10,359,061 B2

ELECTRO-HYDRAULIC ACTUATOR

RELATED APPLICATION

This application is a continuation of U.S. patent application Ser. No. 14/471,410 filed Aug. 28, 2014 and entitled "Remote Electro-Hydraulic Actuator." application Ser. No. 14/471,410 claims priority to and the benefit of U.S. Provisional Application No. 61/871,564 filed Aug. 29, 2013. The entire content of these applications are herein incorporated by reference in their entirety.

FIELD OF THE DISCLOSURE

The present invention relates to a remote electro-hydraulic actuator. In particular, the invention relates to an actuator for actuating and controlling a valve.

BACKGROUND

Industrial, residential and mobile, including power generation, transportation, automotive and aerospace, controls systems often require actuation of mechanical components. Mechanical components of such systems may include valves that must be actuated. Such actuation is generally accomplished via pneumatic, hydraulic or electric components and/or systems. There are generally three different remote controlled types of valve actuation.

Valve actuation may be accomplished by electric components, including permanent magnet direct current (PMDC) motors, brushless direct current (BLDC) motors, direct current stepper motors, linear or rotary solenoids. Electric actuation is susceptible to environmental temperatures and suffers from reliability issues, especially in mobile applications due to the variations in operating environment and the harsh engine compartment/under hood environment.

Valve actuation may also be accomplished by pneumatic or electro-pneumatic means using pneumatically controlled linear or rotary actuators. Such actuators may include on/off or proportional actuation. Pneumatic and electro-pneumatic systems suffer from low position accuracy due to the compressible nature of the fluid, typically atmospheric air, used for actuation and the moisture generated in the air compressor system.

In addition, valves in mechanical systems may be actuated by electro-hydraulic means, using hydraulically controlled linear or rotary actuators. Such actuators may employ on/off or proportional control. Conventional electro-hydraulic actuators use oil from the engine lubricating system or other high-pressure hydraulic power assist systems. The pressures of the engine lubricating systems are in the neighborhood of 100 psi and vary with engine speed.

BRIEF DESCRIPTION OF THE PRIOR ART

Electro-hydraulic actuators are known in the prior art. For example, U.S. Pat. No. 7,419,134 to Gruel is titled "Valve Actuation Assembly." European Patent Publication No. EP 0 248 986 to Vick et al. is titled "Rotary Vane Hydraulic Actuator." U.S. Pat. No. 5,007,330 to Scobie et al. is titled "Rotary Actuator and Seal Assembly for Use Therein, U.S. Pat. No. 6,422,216 to Lyko et al. is titled "Exhaust Gas Recirculation Valve."

APPLICATION OF THE INVENTION

Embodiments of the invention may be used, for example in automotive, aeronautical, rail or other transportation applications of internal combustion engines. In order to minimize pollutants produced by internal combustion engines, a portion of the engine exhaust may be recirculated to an intake of the engine. An exhaust gas recirculation (EGR) valve, such as a mixing valve, may be used to assist in directing the portion of the exhaust to the intake. Such valves typically require a great deal of torque for actuation during engine operation. In addition, such valves are often disposed within the engine compartment and, thus, require compact actuation assemblies due to space constraints

DETAILED DESCRIPTION

Figure 1:
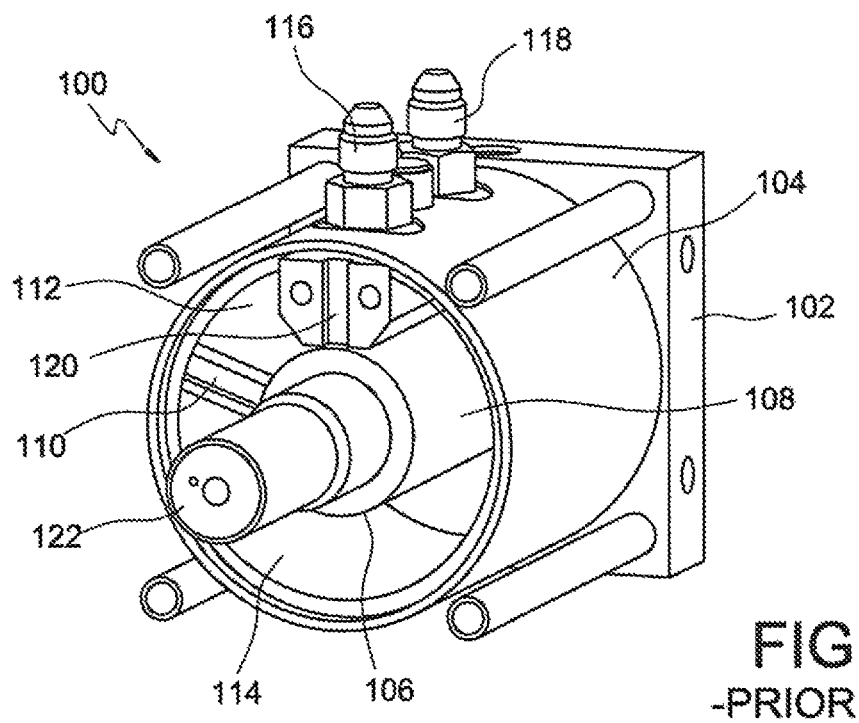
FIG. 1 shows a perspective view of a single vane rotary actuator as is known in the prior art.
Figure 2:
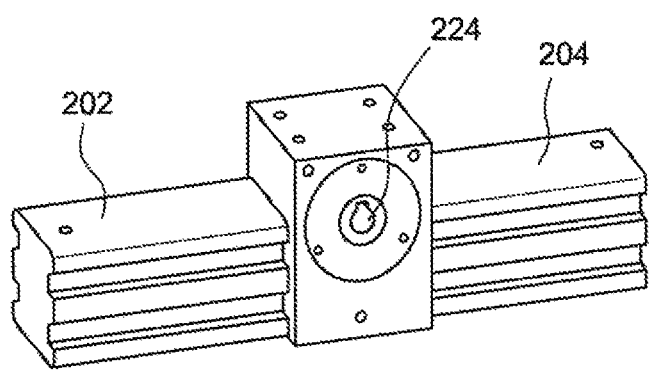
FIG. 2 shows a perspective view of a piston rotary actuator as is known in the prior art.
Figure 3:
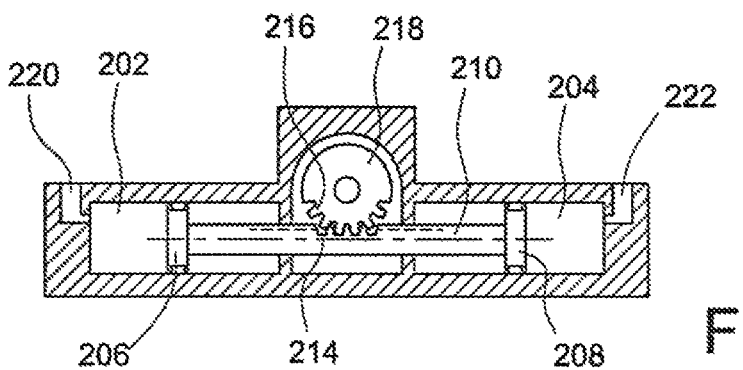
FIG. 3 shows a cross-sectional view of the piston rotary actuator of FIG. 2.

There are several design variants of rotary electro-hydraulic actuators as known in the prior art and shown in FIGS. 1-3. FIG. 1, for example illustrates a single vane rotary actuator. Such an actuator 100 includes a base or lower cover 102. A housing 104 with a cylindrical interior extends from the lower cover. An upper cover (not shown) covers the other end of the housing 104. The actuator 100 further includes a rotational assembly 106, which includes a hub 108 and a vane 110. In addition, the actuator includes a partition wall 120. The vane in conjunction with the partition wall divides the interior of the housing into two chambers 112, 114. The actuator also includes an input port 116 and a return port 118. Accordingly, when hydraulic fluid is pumped into the actuator through the input port 116 and fluid is allowed to exit through the return port, the actuator will rotate in a first direction. When fluid is pumped into the actuator through the return port 118 and fluid is allowed to exit through the input port, the actuator will rotate in the opposite direction. A shaft 122 extends from the hub 108 to transfer torque to the device to be actuated. The flow direction and rate are controlled via a remote or onboard control valve. These are usually spool valves or poppet valves.

FIGS. 2-3 illustrates an alternative electro-hydraulic actuator as known in the prior art using a cylinders 202, 204 and pistons 206, 208 connected by a rod 210. The rod 210 includes teeth 214 that engage with teeth 216 on a rotating member 218. In such a system, the hydraulic pressure is applied to one or the other piston through ports 220 or 222. This causes the rod 210 to translate, which imparts rotational motion to the rotary member 218. This rotary motion can be output from the actuator via a hub 224.

In almost all rotary applications the valve is of the single vane design, such as shown in FIG. 1. However, in such actuators, the torque that the actuator is capable of producing is proportional to the effective surface area of the vane. In order to increase the available torque, the vane surface area, and thus the size of the actuator must be increased. Accordingly, it may be advantageous to utilize an actuator having more than one vane. For example, using two vanes effectively doubles the available torque without increasing the overall size of the actuator. Provided, however, that increasing the number of vanes allows for increased torque by increasing the vane areas but with a reduction of the range of rotational movement of the actuator. A single vane actuator has a potential rotational capability of about 300 degrees, depending of the chamber partition wall and vane thickness, while a two-vane actuator rotation have about 150 degrees and a three vane actuators has about 80 degrees rotation, etc.

One of the major challenges of a multi-vane rotary actuator is to route the pressurized hydraulic fluid to the input and output ports of the actuator. For example, when the valve is commanded to move clockwise, one (or more) chamber(s) is pressurized while another one (or more) chamber(s) is discharged to a reservoir. The routing of the fluids may be controlled via a multipart spool valve but the required input and output passages required to be routed from the spool valve to the chambers can be complex and requiring a multi-way spool valve options that are expensive and significantly increase the overall size of the actuator. Embodiments of the present invention address this and other deficiencies of the prior devices.

Figure 4:
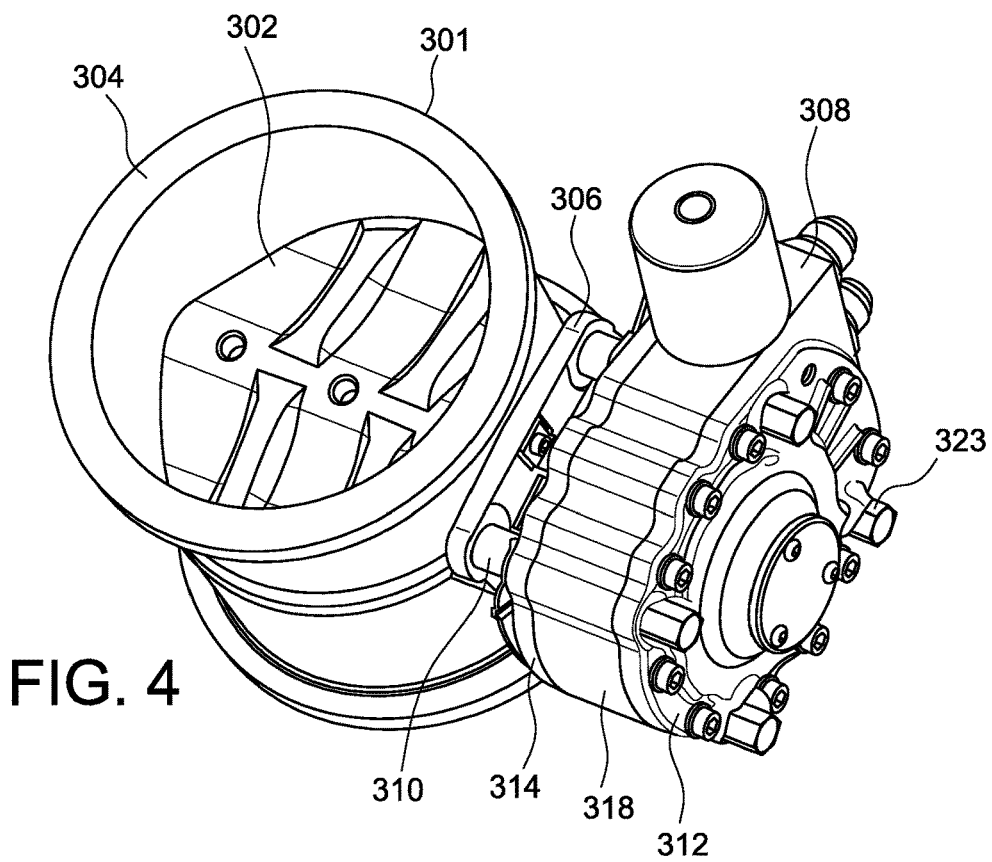
FIG. 4 shows a perspective view of a valve and actuator in accordance with embodiments of the present invention.
Figure 5:
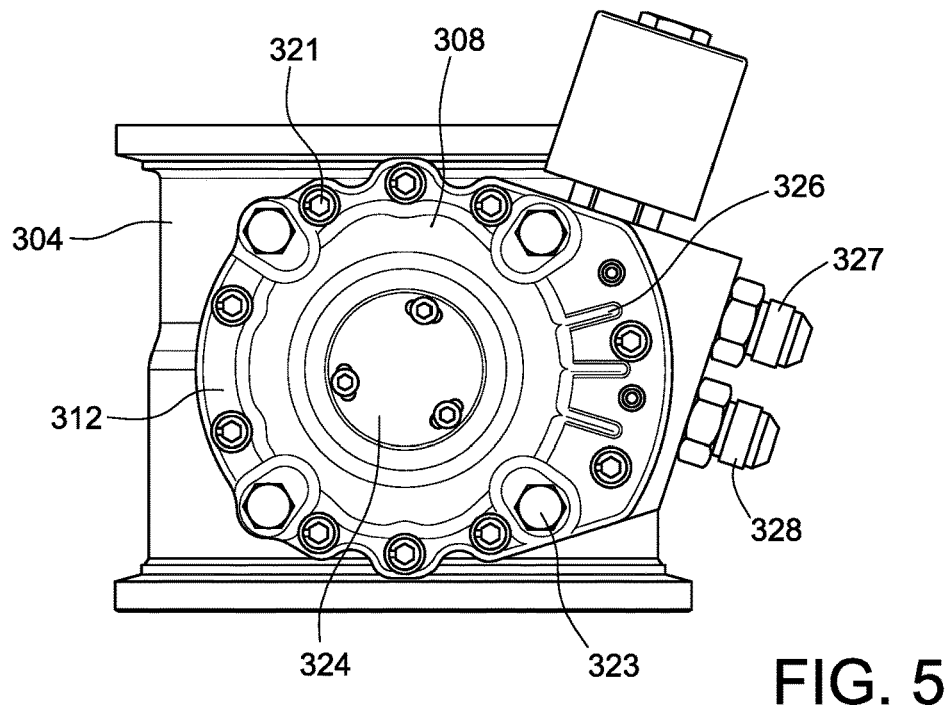
FIG. 5 shows a top view of the valve and actuator of the embodiment of FIG. 4.

FIGS. 4-5 illustrate a valve assembly 301 and actuator 308 in accordance with embodiments of the present invention. A butterfly valve plate 302 is positioned within a valve housing 304. The valve housing may be installed in the exhaust system of an internal combustion engine. The butterfly valve plate 302 may be opened and closed to control the flow of fluid through the housing 304. Support posts 306 extend from an outside surface of the housing. The support posts may be used to mount an actuator 308. The posts may also provide thermal insulation for the actuator assembly, protecting it from the heat of the exhaust gases passing through the housing 304.

In addition, insulating washers 310 may be mounted on posts 306 to minimize the conductive heat transfer. Other means of minimizing convective and radiant heat transfer into the actuator is making the use of heat shields. These heat shields can be in for of single-walled or multi-walled designs containing insulating materials or just relay on an air gap. Alternatively, other mounting means may be used to secure the actuator 308 to the valve housing 304. Additionally, the lower cover 314, housing 318 and upper cover 312 may include holes 322 (see FIG. 7) that provide a means for securing the actuator 308 to the posts 306 and the valve assembly 304. For example, bolts 323 (shown in FIG. 4) may be inserted through holes 322 into posts 306. In the illustrated embodiment, the actuator assembly is attached to the flow modulating device, valve 301, via four M10 bolts 323. Depending on the geometric shape and size of the actuator the number of bolts can be reduced in number or changed in size.

Figure 6:
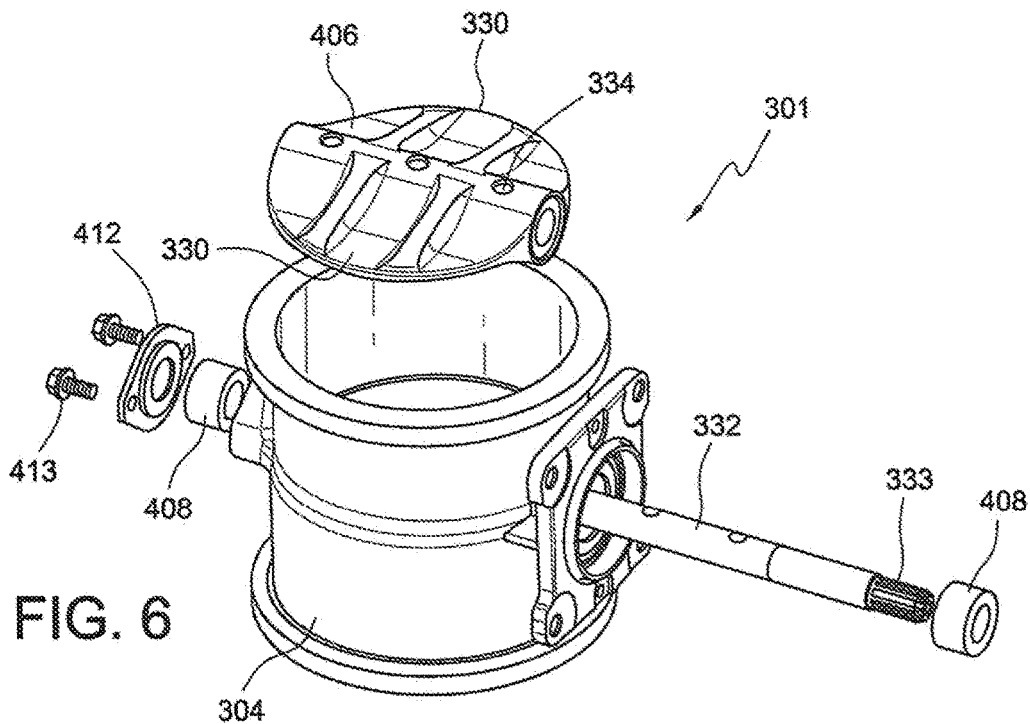
FIG. 6 shows an exploded view of a valve assembly according to an embodiment of the invention.

FIG. 6 illustrates an embodiment of the valve assembly 301. The valve in this embodiment is a butterfly valve. The main function of the butterfly valve described in this embodiment is to modulate fluids in internal combustion engines. Although references are made that the butterfly is being used on internal combustion engines it can be used to control fluid flow for many applications, ranging from engines, industrial and residential fluid control systems. These fluids can be cold or extremely hot. In certain applications gaseous exhaust temperatures reach temperatures in excess of 800° C. and careful selection of the alloys is required. Modulating sealing surfaces, shaft journals and bearings and shaft seals are the major wear components of the valve and high nickel and cobalt alloys are required. In the case of this embodiment, a butterfly valve is being described because of its pressure balancing characteristics but flap valves can also be considered for this actuator application.

The illustrative valve assembly 301 includes a main valve housing 304. A shaft 332 extends through a sidewall into the interior of the housing 304. The valve assembly further includes a butterfly plate 406 positioned inside the housing 304. The butterfly plate 406 includes first and second vanes 330 extending in opposite directions. The butterfly plate is connected to a shaft 332 that extends through the sidewalls on opposite sides of the housing. The shaft 332 may extend beyond the house wall on the side adjacent the actuator 308 in order to engage with a hub of the actuator. The butterfly valve vanes 330 may be connected with the shaft 332 by fasteners 334, such as retention screws. The valve assembly may also include bushings or bearings 408 and a shaft end cap 412. The end cap may be secured to the housing 304 by screws 413 or other fasteners in order to secure the shaft 332 in position. The valve can be configured to attain a normally open or a normally closed butterfly valve condition by adjusting the vane assembly or switching the hydraulic input/output ports.

The actuator of the present invention is not limited to use with the butterfly described herein. In addition to a butterfly or flap valve, embodiments of the actuator may be used with any flow-modulating device, including for example single or multiport gate valves, globe valves, disk valves, stem valves, or other appropriate valves. In addition, the actuator may be used in rotational and linear mechanical motion devices. The actuator may be used in any device that can accept rotational motion as an input, including devices where rotational motion is transformed into linear or other motion by screws, linkages, gear trains, rack-and-pinion assemblies, etc.

Figure 7:
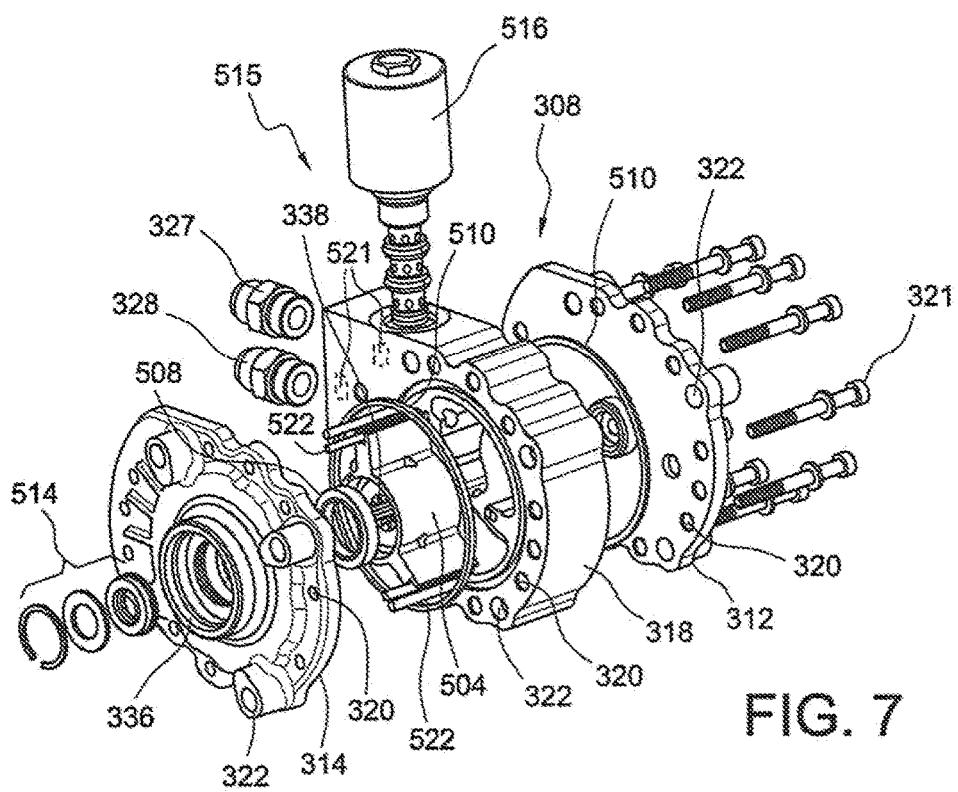
FIG. 7 shows and exploded view of an actuator assembly according to an embodiment of the invention.
Figure 8:
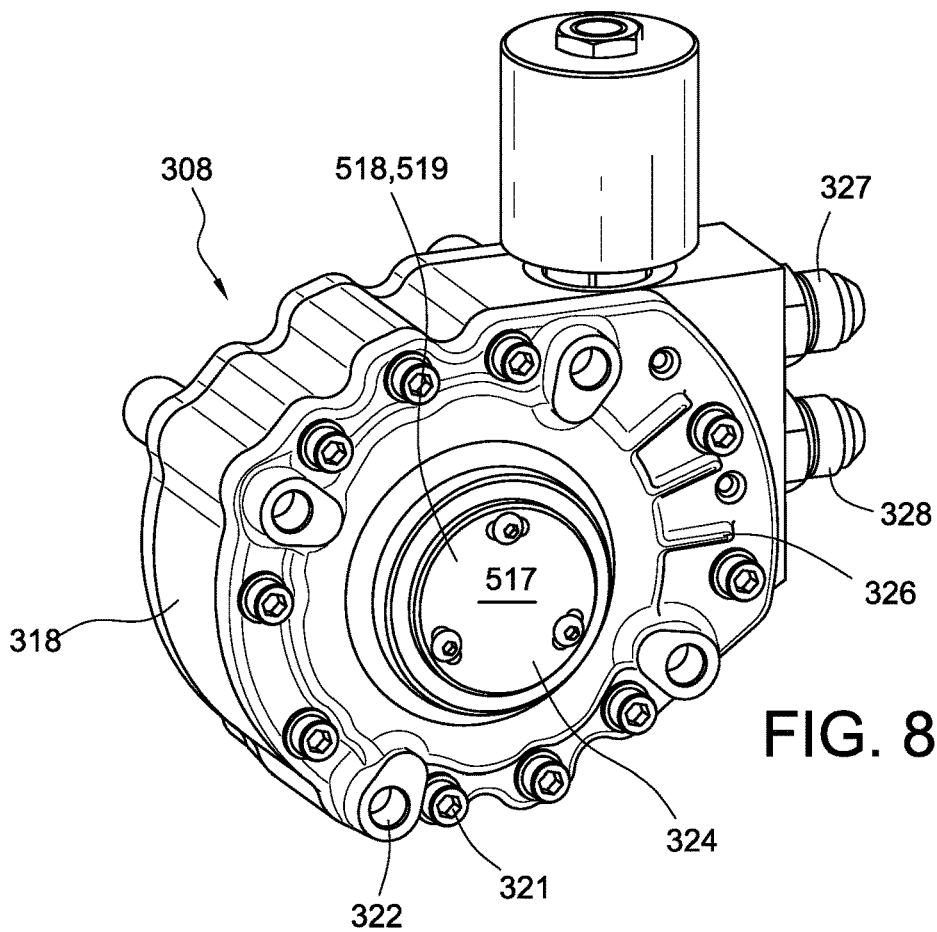
FIG. 8 is a perspective view of the actuator assembly of FIG. 7.

Embodiments of the actuator 308 are illustrated in FIGS. 7-8. The main function of the actuator is to position the fluid modulating valve 301 according to the required engine control parameters. The actuator represented in this embodiment is a dual vane design and has a total rotational travel of 85 degrees. Other vane configurations or rotational travel would be apparent to one of skill in the art.

The actuator 308 may comprise a housing 318. The housing is sealed by an upper cover 312 and a lower cover 314. However, while this and other embodiments described herein illustrate an actuator assembly having a housing with separate upper and lower covers, it should be understood that two or more of these components may be formed as a single piece. For example, the housing and upper cover may be formed as single piece, or the housing and lower cover may be formed as a single piece.

Embodiments of the actuator may also include a vane 504 for rotation within the housing 318. The vane 504 may rotate on a bearing 508 and main include vane tip seals 522. The housing 318 and covers 312, 314 may also incorporate housing seals 510 to better seal between the components. In addition, a main shaft seal assembly 514 may be used to seal against the shaft 332 extending from the valve assembly 301. The shaft 332 may also engage with a standalone shaft sensor or contain part of the shaft positioning sensor assembly when used in conjunction with a shaft position sensor 518 and/or an electronic control circuit board 519 positioned beneath a cover 517.

Single or multiple actuator control valves may be used in the application. The valve may be a two-way/two-position cartridge spool valve with a proportional design or any other appropriate valve. The valve may be incorporated into the upper cover 312 or into the lower cover 314 and fluid may be routed to chambers of the actuator as required. Alternatively, the valve may be incorporated into the side of the actuator. The control valve 516 may be coupled to fittings 327, 328 for connecting with a hydraulic pump of the hydraulic system or a pneumatic pump if a pneumatic system is used.

As shown in FIGS. 7-8, the upper cover 312, housing 318 and lower cover 314 may include through holes 320. Bolts, screws or other fasteners 321 may be inserted into these holes 320 in order to secure the covers 312, 314 to the housing 318. In the illustrated embodiment, these fasteners include eleven M6 bolts. Depending on the geometric shape and size of the actuator the number of bolts can be reduced in number or changed in size. The holes 320 may be internally threaded or may provide other features that contribute to securing the components. The actuator 308 may have a generally central axis 324 about which the rotational assembly of the actuator rotates. The upper cover 312 may have reinforcing struts 326.

Figure 9:
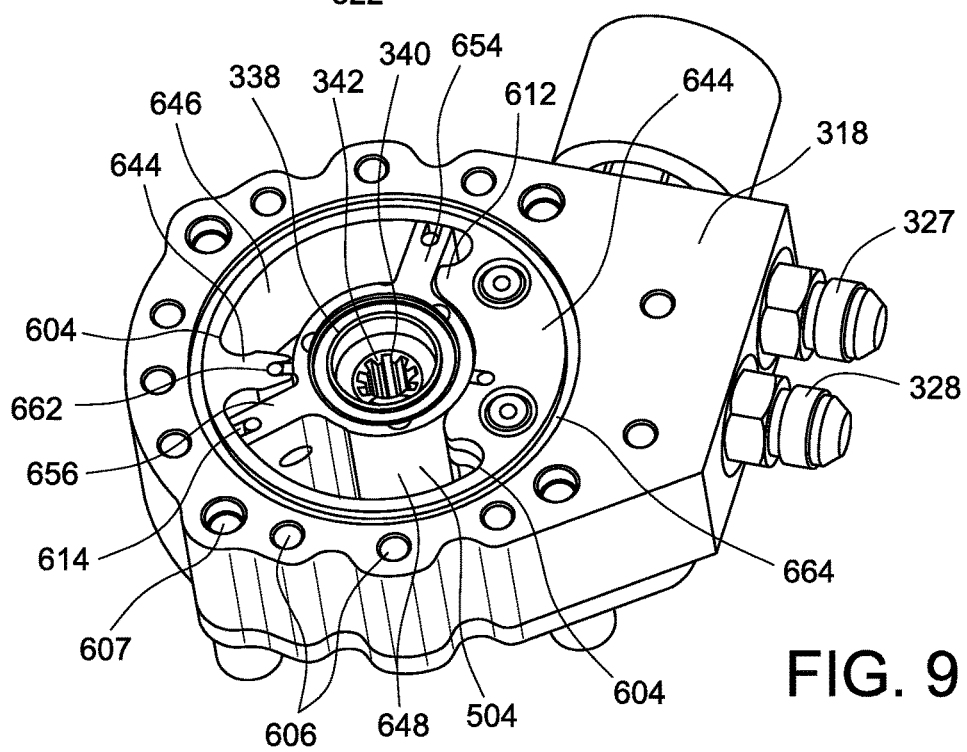
FIG. 9 is a perspective view of an actuator main housing according to an embodiment of the invention.

As shown, by example, in FIG. 7, a bottom cover 314 of an actuator 308 may include an opening 336. A hub 338 of the rotational assembly of the actuator may be exposed through the hole. As shown in FIG. 9, the hub 338 may include a female socket 340 recessed into the huh. The socket 340 may include splines 342 that engage with splines 333 formed on shaft 332. The splines can be arranged symmetrically around the whole circumference or can be asymmetric or lost tooth format. The hub can be designed of any alloy, but given the tendency of high torque requirement and high temperature applications, the alloy selected will be of low heat conducting, high toughness and low wear characteristics.

FIG. 9 depicts an embodiment of the actuator main housing 318 and vane rotational assembly 648. The depicted main housing consists of an extruded aluminum profile that attains near net shape conditions. Although other manufacturing processes such as die casting, forging, etc. can be used for this part, extruded aluminum profile provide near net shape parts that do not require major post manufacturing processes, offer dimensional stability and high physical properties. Extruded aluminum alloys also can be easily coated or plated with wear reducing and low friction coatings and plating.

The internal profile is designed to contain the travel end stops 612 and sealing surfaces 614 of the rotating vane 504. Corner radii 604 of the internal profile are shaped to allow for any secondary profile clean up using robust machining tools. Passages for assembly bolts 606, attachment screws 607 and coolant routing 608 are extruded to minimize the post machining processes.

The extrusion design option also allows the sizing of the actuator. The torque capabilities of the actuator are directly proportional to the area exposed to the pressurized working fluid. The area is a function of the diameter and length of the vane 504, and thus extrusion generates an easy option to cut the actuator length within the extrusion length. The length of the actuator 610 is partially restricted by the packaging constraints but in general range from 25 mm to 75 mm. The actuator vane depicted in this application is 35 mm length to achieve the specified torque characteristics of 40 Nm of torque.

The main housing depicted in FIG. 9 can be configured to house the working fluid inlet and outlet ports 327, 328 and the electric hydraulic control valves. Although inlet and outlet ports depicted are of the external flare style and of different size to eliminate assembly mistake they can be of any size, type and gender to achieve the required connection point and mistake proofing.

The actuator main housing is for a dual vane actuator design hut the extrusion profile could be designed into any shape to achieve from single to multi vane actuator design with the gain in torque output but with loss of rotational range. As shown in FIG. 9, the housing has a generally cylindrical inner cavity. Partition walls 644 extend from an inner surface 646 of the cavity. A rotational assembly 648 is positioned for rotation about a central axis of the actuator housing. The rotational assembly includes a hub 338 with a first vane 654 and a second vane 656 extending from the hub.

To minimize internal leakage, the tip of the vanes 654 and 656 can be sealed against the inner surface 646 of the housing 31 by tip seals 614 or by using tightly toleranced parts and thermal conductive matched. Chamber seals 662 seal the ends of partition walls 644 against hub 338. In addition, housing seals are fitted into grooves 664 in order to seal upper and lower covers to the housing 318. In addition, bearings (not shown) may be utilized to facilitate rotation of the rotational assembly 318. The bearings may be deep groove bearings.

Figure 10:
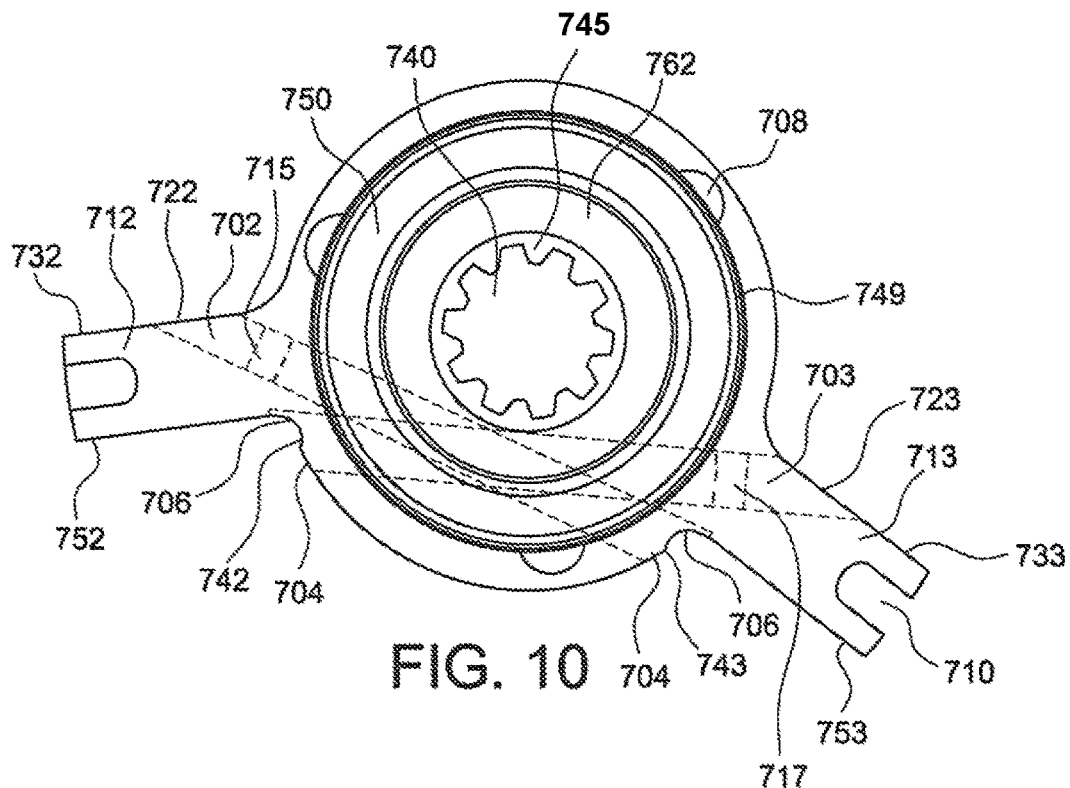
FIG. 10 shows a top view of a vane rotational assembly according to an embodiment of the invention.

FIG. 10 depicts a vane rotational assembly configuration used in an embodiment of the invention. Main functions of the vane in this application are to house the bearings, serve as the working fluid manifold, transmit rotational motion to device to be driven shaft and seal the working chambers. The seals can be of various types: force activated wiper seals and labyrinth style seals.

The area of the actuator vane exposed to the pressurized working fluid determines the performance to of the actuator assembly. In multi-vane actuator applications one of the main challenges is the routing of the working fluid to and from the required chambers and its manufacturability. Embodiments of the vane actuator may be manufactured by various methods, including extrusion and investment casting. Vane communication passages or manifolds 702, 703 are depicted in FIG. 10. These passages can be achieved via investment casting, 4-axis electrical discharge machining (EDM) or cross drilling. Spark eroding the communication channels with a 4 axis EDM process is slow and expensive and challenged by the line of sight and passage size restricted by the vane interior diameter feature that connects to the output shaft of the shaft from the device to be driven. Investment casting allows the option to cast the passages in circumferential geometry and allows for non-circular cross-section allowing the flow to be maximized. Special cores and core support have been designed to achieve this configuration.

The size and the geometry of this passage control the performance of the valve. Smaller holes or inserted orifii may restrict the fill of the secondary chambers while inserted check valves can time the fill of the secondary chambers. The flow area of the communication passages can be 10 to 50 mm$^2$ but in general are sized to 30 mm$^2$ as depicted in this embodiment to adapt commercially available check valves.

In the case of investment casting and extrusion, which are of the near net shape manufacturing processes, features 704 are formed into the vane geometry to minimize the final machining process and help in the use of highly robust cutting tools to minimize the manufacturing process cycle. Undercut areas 706 in the vane to hub area may be used to eliminate the need to use very small diameter contouring tools as well as serve as the starting edge for the cross drilling, 4-axis EDM or press feature for the check valves or orifii.

Sealing of the working chambers may be achieved with vane tip seals inserted into channels 710 formed at the tip of vanes 712, 713 and hub radial seals 708. These seals can be dynamic seals like labyrinth seals or force activated static seals. Force activation is mainly achieved via elastomers or metal springs while the wiping element is a low friction chemically inert compound such as a polytetrafluoroethylene (PTFE) material, for example TEFLON.

FIG. 10 depicts an internally supported vane via the bearings toward the hub extensions in the covers, externally supported vane is also possible but such a design does not allow for minimized packaging.

As illustrated in FIG. 10, an actuator in accordance with embodiments of the present invention flows the working fluid through strategically sized flow channels 702, 703 within the structure of the vane assembly. The ports and passageways are sized to provide dampening and improve the stability of the valve and can also be provided with pressure check valves or reed valves to dampen the rotation of the valve and reduce any instability due to pulsations driven back via the output shaft.

For example, vane 713 may include a port 723 formed in a first face 733 of the vane. The port 723 is connected via an internal passageway or manifold 703 to a port adjacent the opposite face 752 of the second vane 712. Likewise, a port 722 on the first face 732 of the vane 712 is connected via an internal passageway or manifold 702 to a port 743 on the opposite face 753 of vane 713.

In this manner, a pressurized flow of hydraulic fluid is applied to face 733 of vane 713 inducing the assembly to rotate in a clockwise direction. The fluid then passed through the body of the actuator assembly, through passageway 703. The hydraulic fluid then applies pressure, to the opposite face 752 of vane 712 increasing the clockwise torque on the assembly. In a like manner, return flow applies a force to the face 753 of vane 713 to rotate the assembly in a counterclockwise direction. The return flow of fluid passed through passageway 702. The hydraulic fluid then applies pressure to the face 732 of vane 712 increasing the counterclockwise torque on the assembly. Flow from the primary chamber to the secondary chambers can be delayed or dampened by the use of orifices and/or check valves 715, 717. The valves 715, 717 may be pressure relief valves. The use of such devices can increase the accuracy of the actuator and dampening characteristics due to the torque fluctuations imparted on the output shaft.

As illustrated in FIGS. 9-10, embodiments of the invention may use a two-vane rotational assembly. The assembly includes a hub 762. Vanes 712 and 713 extend from the hub. In this embodiment, the vanes are offset at an angle less than 180 degrees in order to accommodate flow channels and valves in the actuator housing. The angle between the vanes will affect the maximum rotation of the actuator and may be any appropriate angle up to 180 degrees. Alternatively, the vane rotational assembly may have more or fewer vanes. The rotational assembly may be formed from multiple components joined together by known means. Alternatively, some or all of the components may be formed from as a single piece.

The support of the rotating members of this valve can be external or internal to the shaft/vane assembly. The use of shaft support in the form of ball bearings, needle bearings, bushings exclusively or combination thereof can generate packaging and cost advantages.

Figure 11:
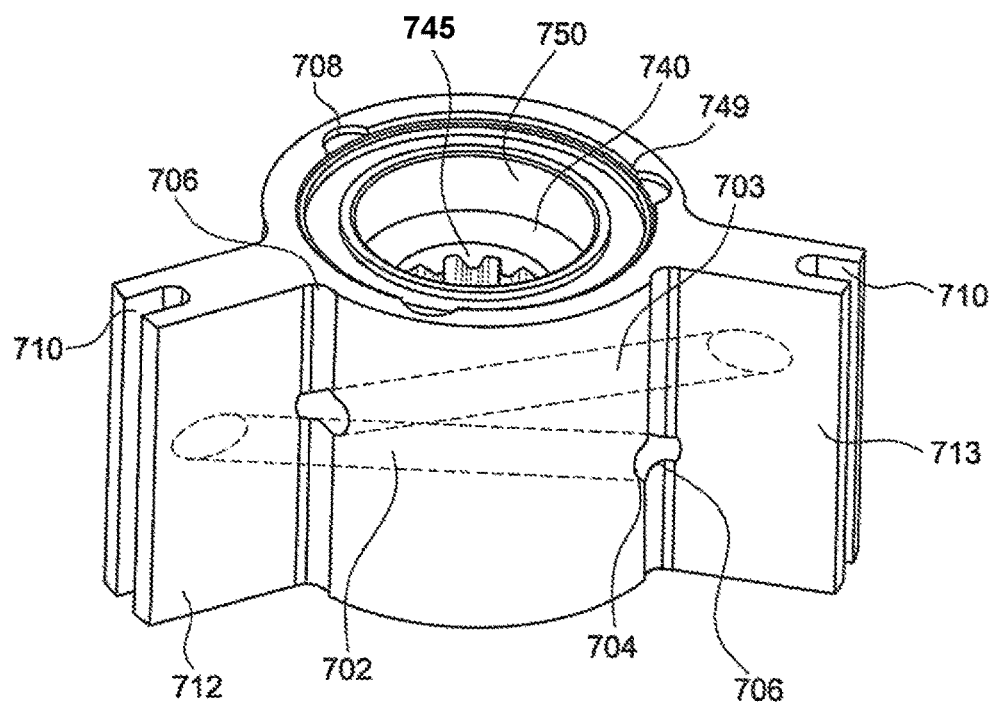
FIG. 11 shows a perspective view of the vane rotational assembly of FIG. 10.

As illustrated in FIGS. 10-11, embodiments of the vane assembly include a hub 762. Vanes 712 and 713 extend from the hub. A socket 740 is recessed into hub 762 for engaging a shaft extending from the device to be actuated. The socket 740 may include splines 745 for engaging corresponding splines on the device shaft. A bearing surface 749 may be formed on a surface of the hub 748 in order to engage with a bearing 750 for rotational movement.

Figure 12:
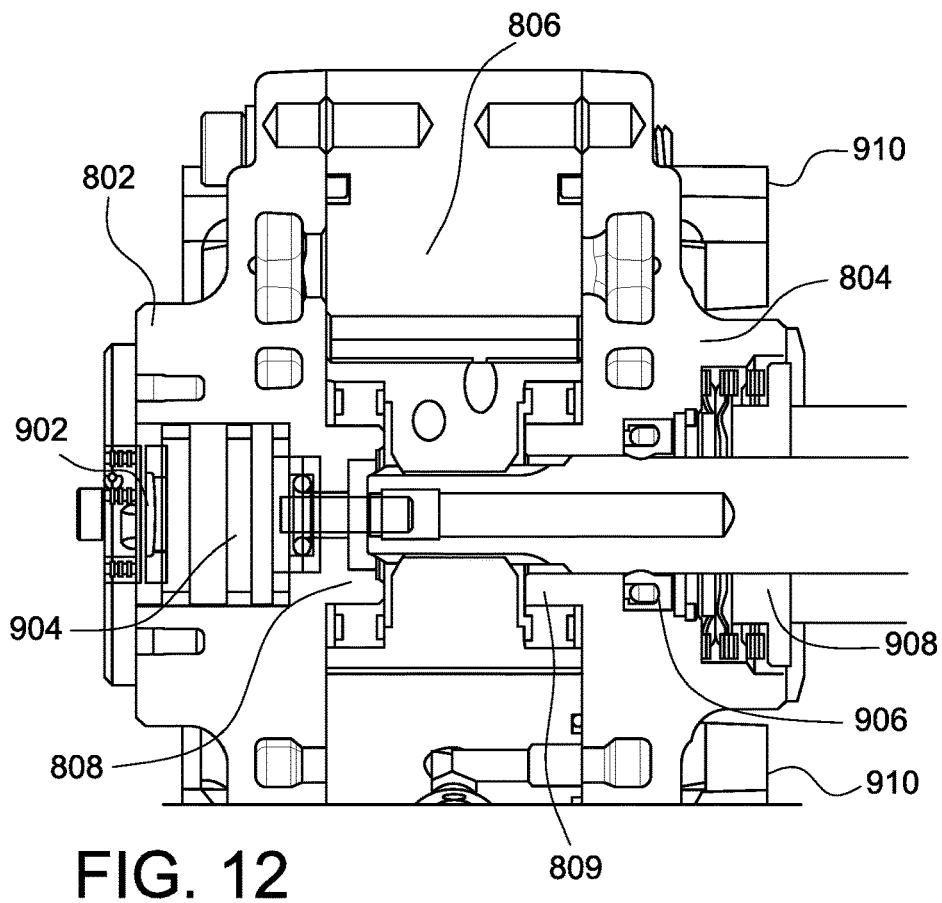
FIG. 12 is a partial cross-sectional view of an actuator assembly in accordance with an embodiment of the invention.
Figure 13:
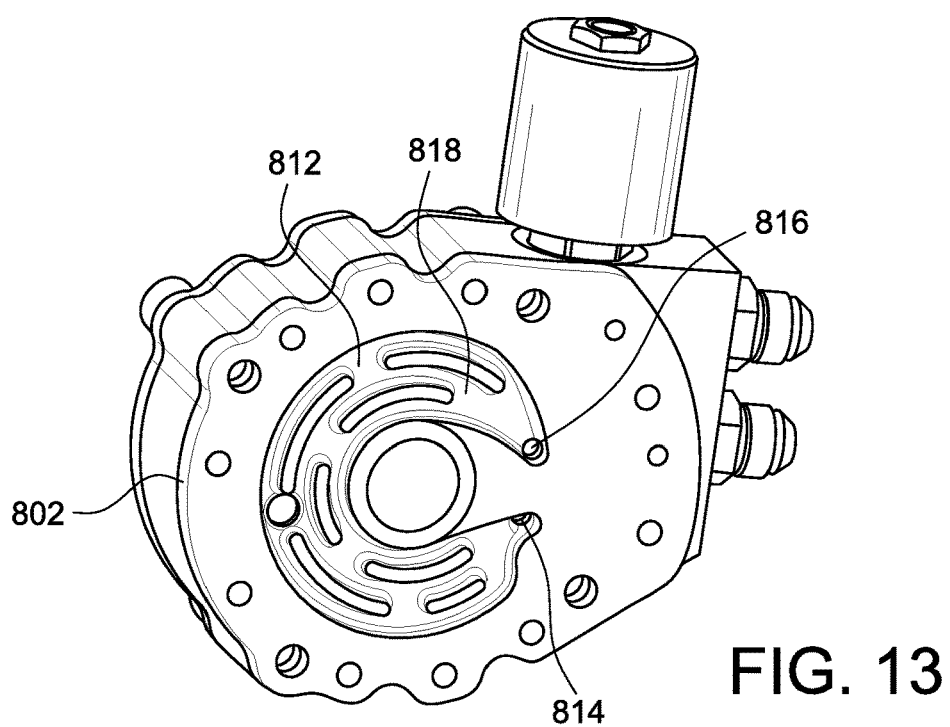
FIG. 13 is a cross-sectional view perpendicular to the rotational axis of an upper actuator assembly cover in accordance with an embodiment of the invention.
Figure 14:
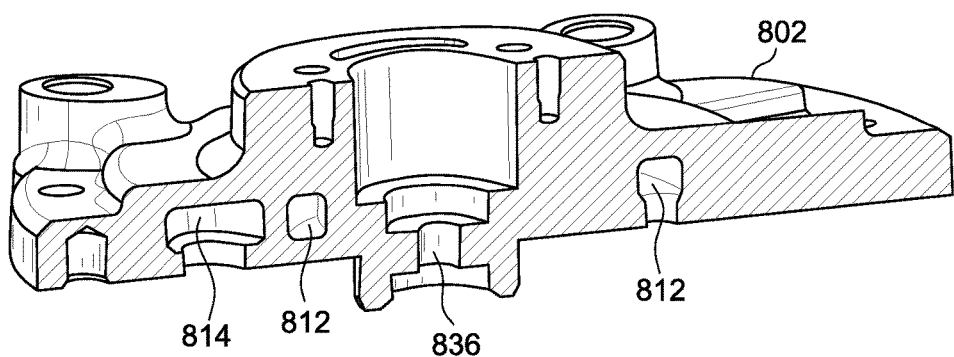
FIG. 14 is a cross-sectional view parallel to the rotational axis of an upper actuator assembly cover in accordance with an embodiment of the invention.
Figure 15:
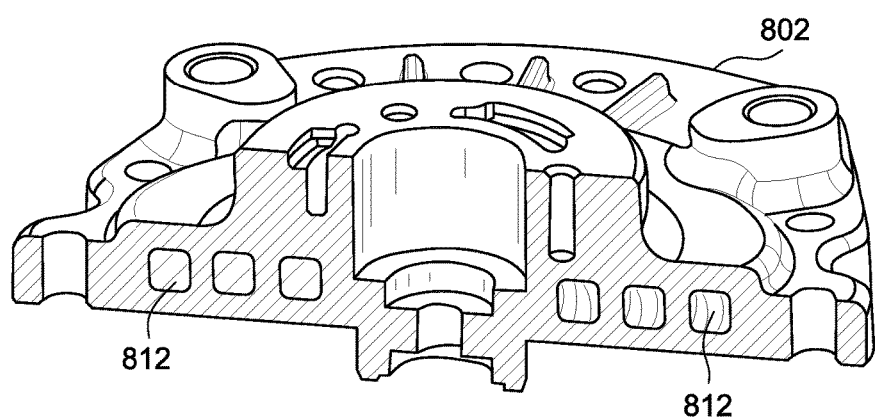
FIG. 15 is a second cross sectional view of the upper actuator assembly cover of FIG. 14.
Figure 20C:
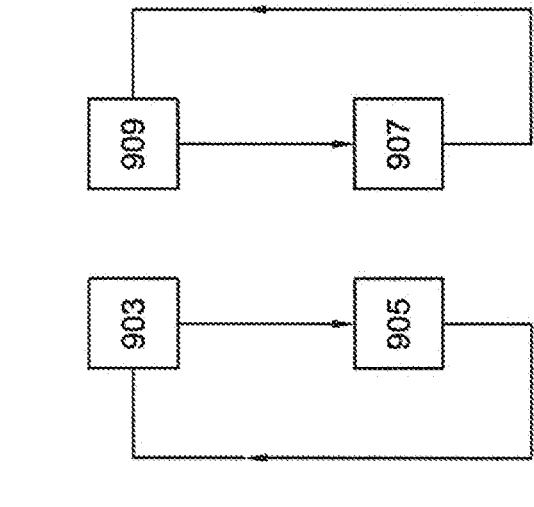
FIG. 20C is a flow diagram of an independent cooling circuit in accordance with an embodiment of the invention.
Figure 20B:
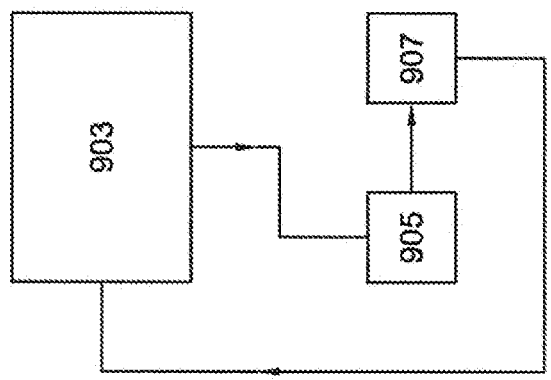
FIG. 20B is a flow diagram of a series cooling circuit in accordance with an embodiment of the invention.
Figure 20A:
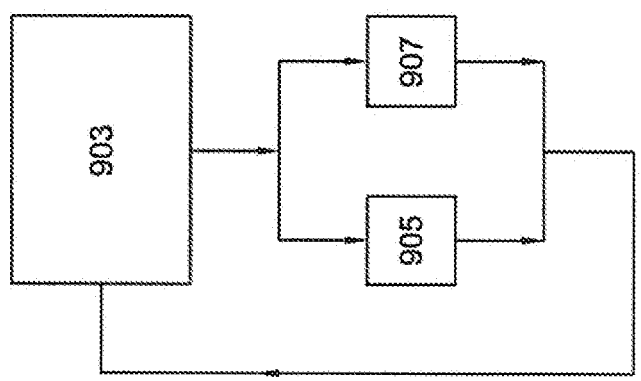
FIG. 20A is a flow diagram of a parallel cooling circuit in accordance with an embodiment of the invention.

FIG. 12 is a cross-sectional view of an actuator assembly of an embodiment. The actuator assembly includes an upper actuator cover 802 and lower actuator cover 804. A function of the covers is to seal the working chambers 806 of the main housing, guide the vane rotation via the cover extension shafts 808, 809 and route the coolant as depicted in FIGS. 13-15. As illustrated in FIGS. 13-15, the upper cover 802 may include closed channels 812 drilled, casted (lost foam invested casting, etc.), formed or cut into the cover. These cooling channels can be machined or cast into the upper cover alone, lower cover alone or into both. The requirement is dictated by the source of the heat: conductive, convective or radiant. Hydraulic fluid provided by a hydraulic pump may be passed through these channels. For example, bypass fluid not used to actuate the actuator may be passed from the pump through the channels before being returned to a reservoir. This fluid may be used to cool the bottom cover and thus provide thermal insulation for the actuator 308. Although the cooling circuit described in this invention makes use of the existing working fluid, either in parallel or in series circuits, the cooling circuit can also be an independent cooling system where engine coolant or any other cooling fluid can be used. As illustrated in FIG. 20A, working fluid may exit the working fluid reservoir 903 and pass in parallel through the primary chamber 905 and cooling circuit 907. As illustrated in FIG. 20B, working fluid may exit the working fluid reservoir 903 and pass in series through the primary chamber 905 and cooling circuit 907. Alternatively, as illustrated in FIG. 20C, a separate working fluid reservoir 903 and cooling fluid reservoir 909 may be used with independent cooling systems such that cooling circuit 907 is not fluidly connected with the flow of fluid through the primary chamber 905.

The origin of the oil can either be from diverting the supply line or passage, and flow may be determined by the amount of oil flow to achieve the cooling action. Sizing of the flow channel, by the use of casting techniques, inserted orifices, etc., determines the flow according the pressure available. Flow can also "timed" via a check valves that cut the diverted cooling oil flow at low oil pressure conditions. Oil pressure is directly related to engine load and thus to the temperatures in the exhaust, i.e. at idle where oil pressure is low (e.g. 20 psi) cooling flow is not required because exhaust gas temperatures are fairly low and do not affect the performance and durability of the actuator.

The cover 802 may have an inlet port 814 formed in an inside surface 818 of the cover that receives hydraulic fluid flowing though the valve and housing of the actuator. The fluid then passes through channels 812 formed in the cover. The fluid then exits through a port 816. Inlet port 814 and outlet port 816 may be located at the cross over ports in the actuator housing. The cooling channels may create a cooling curtain that is sized to achieve the maximum surface area. The upper cover 802 may have an opening 838 through which the huh or shaft of the rotational assembly may be exposed.

Cooling flow may be made through the upper cover. Alternatively, the cooling flow can also pass through the main body or lower cover. Or the flow may pass through multiple or all of these portions depending which part of the actuator may benefit from being be cooled or protected. These flow passages can be in the form of drilled, caste or formed passages or rerouted by external conduits such as hoses and tubes.

As shown in FIG. 12, the upper cover in addition to above mentioned functions may also contain electronic control circuitry, electric/electronic input/output circuitry 902 and/or a shaft position sensor 904. The shaft position sensor may be a standalone sensor. The electronic control circuitry may comprise a printed circuit board, and the printed circuit board may be rigid at least in part and/or flexible at least in part. An additional function of the lower cover is to house a main shaft seal 906, house additional sealing components 908 that contain minute exhaust leaks during extreme engine transients and serve as a structural interface to the valve or other device to be driven, for example through support posts 910. Although the figure depicts covers without any control valves, the castings can easily be designed to contain the fluid control valve.

Figure 16:
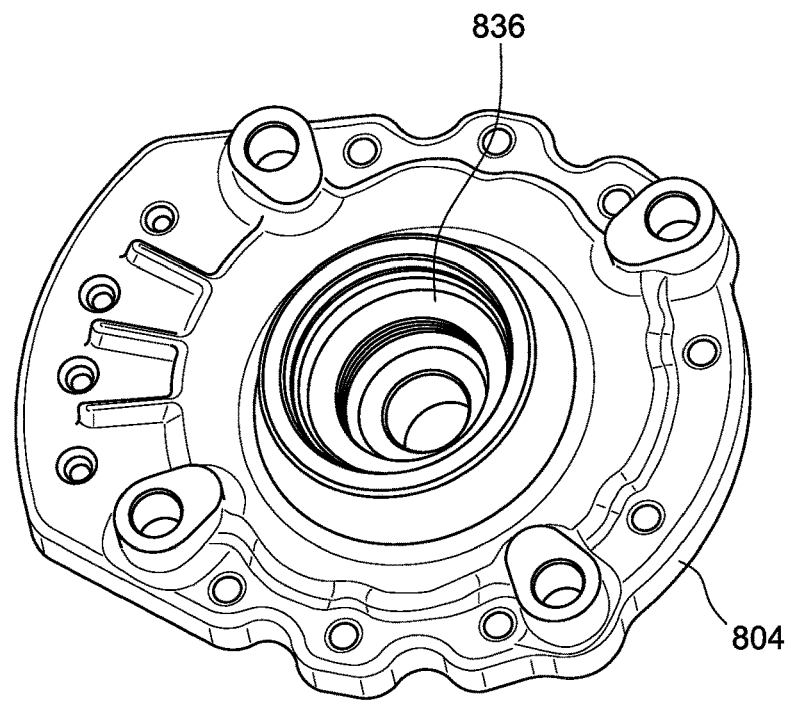
FIG. 16 is a perspective view of a lower actuator assembly cover in accordance with an embodiment of the invention.
Figure 17:
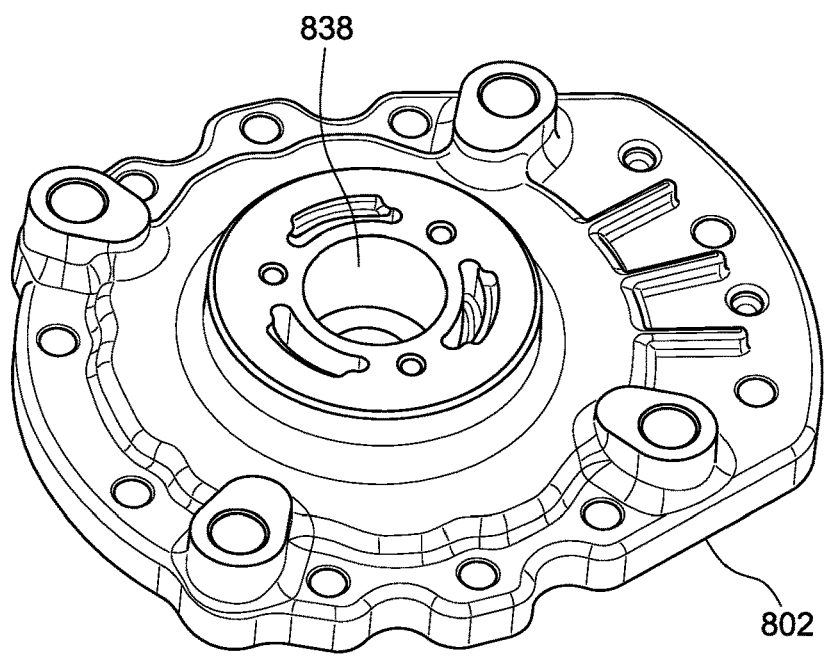
FIG. 17 is a perspective view of an upper actuator assembly cover in accordance with an embodiment of the invention.

As depicted in FIG. 16, lower cover, and FIG. 17, upper cover, embodiments of the invention include a configuration in which routing and control of the coolant circuitry is positioned within a single-piece aluminum component. This unique design allows for one casting that fits multiple applications and that provides both lower and upper covers. The lower and upper raw castings or forgings are designed to be common and then machined according to the application. Machining variation can generate many different variants of the actuator according to its application, including: a smart drive by wire actuator, a passive actuator. For example, the lower cover 804 shown in FIG. 16 use the same casting as the upper cover 804 of FIG. 17. The cover 802 may then be processed or machined to create an opening 836 to accommodate a shaft seal and become the lower cover. The cover may be processed to have an opening 838 that may accommodate sensors or other control circuitry and thus become an upper cover. In this way, the actuator may be internally cooled, top cooled or bottom cooled. It may also use fluid or gaseous cooling, serial or parallel cooling or no cooling. Such a symmetric configuration also has advantages for manufacturing tooling cost, only one casting or forging tool is required. The coolant circuit can be present in the upper or lower cover or both depending of the application. Aluminum lost foam, investment casting, forging and brazed, billet machined and brazed processes may be the processes of choice for this design but is dependent on production volume.

Figure 18:
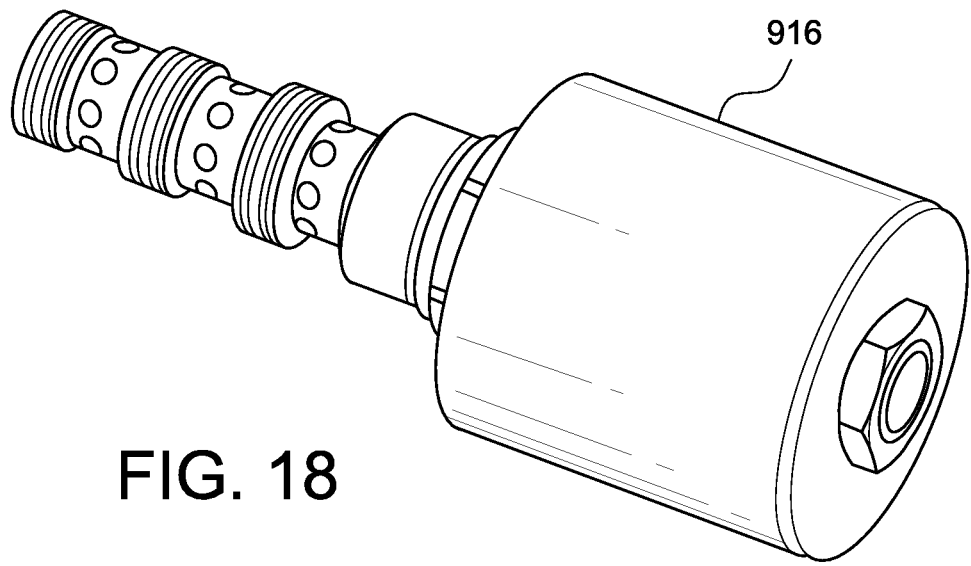
FIG. 18 is a perspective view of a spool valve as used in embodiments of the invention.
Figure 19:
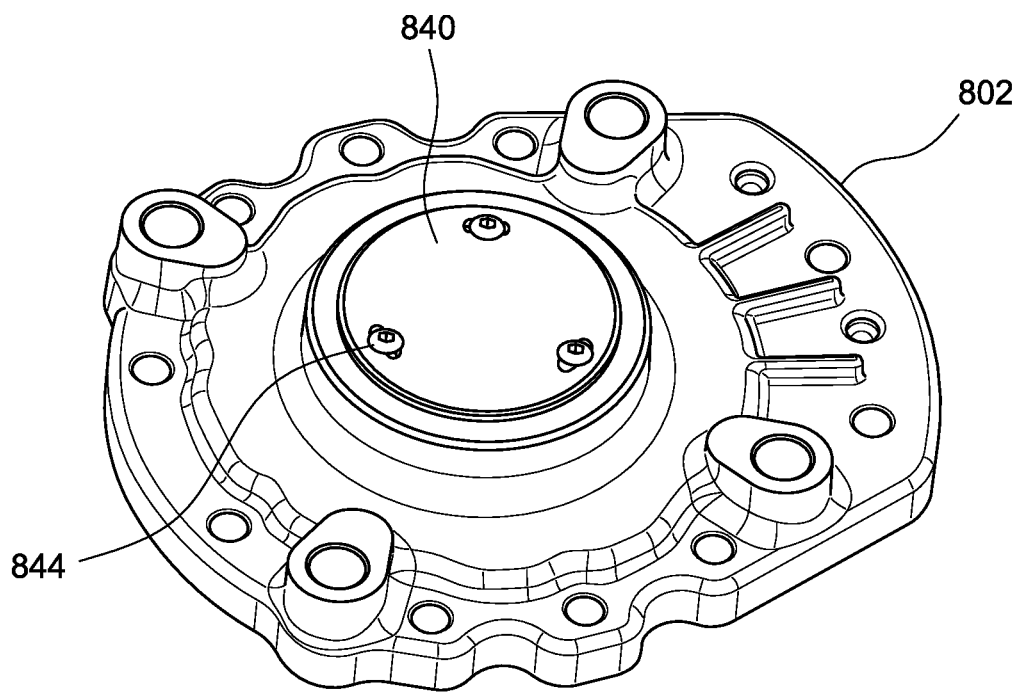
FIG. 19 is a perspective view of the upper actuator assembly cover of FIG. 17.

As shown in FIGS. 18-19, in embodiments of the present invention, directional and modulating control of the working fluid from one chamber to another of the actuator may be controlled via an electronic proportional solenoid 916. Although hydraulic and pneumatic fluids are discussed in this application, any compressible or non-compressible gases and liquids can be used as the working fluid. The proportional solenoid can be of the push, pull or dual actuated style. The modulation can be achieved via a single multiport spool valve, multiple dual port spool valve or pairs of proportional poppet valves. As shown in FIG. 7, embodiments of the invention may include a control system 515 that uses the valve 516, whether proportional, poppet or other, to maintain the position of the actuator. For example, the control system may include one differential or two absolute pressure sensors 521 to sense the differential pressure across the two chambers. The control system periodically compares the pressure. If the control system detects a pressure differential, the system compensates by appropriately increasing or decreasing the fluid in the chambers. This balancing of fluid pressure between the chambers is accomplished using one or more of the valves as described. In this manner, the actuator can maintain the position of the actuator and thus the valve or other device being driven by the actuator.

Sizing of the ports and number of valves determines the response time of the actuator and the pressures losses that directly results in the loss of torque. The valve size may vary as appropriate for the application as would be understood by one of ordinary skill in the art. The actuator can be configured with the proportional solenoid valve in the upper cover, main actuator housing or lower cover. The solenoid depicted in FIG. 18 is designed to be installed in the actuator main housing due to packaging constraints and to reduce the overall size of the actuator mechanism.

The proportional valve(s) can contain mechanical position feedback or electronic position feedback. In the case of mechanical feedback the spool of the valve is biased via a spring cam mechanism to attain and maintain the commended position. If electronic position feedback is used, Hall effect or similar sensors are being used to obtain spool position feedback. In an alternative embodiment, pressure feedback from the actuator working chambers may be used in commanded positioning and to aid in the critical dampening of the actuator/valve. These types of feedback maybe used to attain and maintain the spool position, which controls the actuator shaft position.

In embodiments of the invention, the position of the actuator is driven by the actuation of a proportional cartridge valve through an analog, pulse width modulated (PWM) or digital signals generated by an Engine Control Unit (ECU). The system can further be augmented with electronic/hydraulic logic to increase the self-sufficiency of the valve such as position, response time, etc.

In accordance with embodiment of the invention, it may be desirable to provide information regarding the rotational position of the rotating assembly such as the rotational position of the output shaft 332 shown in FIG. 6 or the female socket 340 shown in FIG. 9. Such position feedback can be open loop or closed loop type. Open loop feedback depends only on the command control of the cartridge valve. Closed loop depends on one or more sensors that are either internal or external to the actuator. These sensors may be contact or contactless sensors, including linear variable differential transformer (LVDT), rotary variable differential transformer (RVDT), Hall effect, resolvers, analog wipers, etc.

Embodiments of the actuator may be configured with or without a shaft position sensor. In the case of open loop control the shaft position sensor is not required and the engine uses other sensors as well as mechanical hydraulic control valve force feedback to control the actuator and thus modulate the valve. In the case of closed loop control the shaft position sensor may be used for initial start-up calibration or continuous control. As shown in FIGS. 17 and 19, the upper cover 802 may include a cavity or recess 838 in which a sensor may be positioned. The cavity 838 may be covered or sealed by a cover 840. The cover 840 may be secured to the upper cover 802 by screws 844 or other fasteners. Alternatively, the cover may itself have threads or engagement surfaces that engage with corresponding portions of the upper cover 802.

Embodiments of the shaft position sensor can be of the standalone design were position feedback is being monitored by a remote centralized control system or installed on a circuit board for actuator onboard circuit design option for decentralized actuator/valve control system or hybrids thereof. In the case of standalone shaft position systems the shaft position sensor can be of the variable transformer, hall effect, magneto-resistive, inductive, capacitive, resistive, optic type or variants of thereof. In the case of integrated shaft positions sensor, the sensor is integrated into the circuit board of the decentralized control system and can be of the many variants discussed above.

FIG. 4 depicts an embodiment of the invention that includes a butterfly fluid modulating valve 302 with a multi-vane actuator, single-multipart proportional spool valve and shaft position feedback. This assembly may be monitored and controlled via remote controllers that can be standalone actuator controllers but can also be part of the engine control unit. This design has the disadvantage that electronic control, power and communication require large number of wires and complex electric connectors. Depending on the feedback and communication 12 wires or more are required. Such configuration suffers from communication time lags, susceptible to electromagnetic interference and electric wire/connector failure due to the harsh environmental conditions existent in the engine compartment.

In another embodiment, the valve is designed to contain its own controller. The communication can be analog or digital. Analog communication can be of the voltage or current type and in the digital case it can be PWM (Pulse Width Modulated), or via CAN (Central Area Network) and its variant. For industrial application these communication can be configured to use Ethernet, RS232, RS 485 and its other variants. This design option retains full actuator onboard control and onboard diagnostics. The circuit board components are selected for harsh environmental conditions and fully encapsulated to protect for cooling fluid exposure with the objective to protect the circuit from external and cool the circuit internal heat being generated. The fully encapsulated circuit board layout is configured to integrate all required major building blocks required for the control, protection and diagnostics of the actuator and the connection points via compliant pins to the input and output connections points for external or internal communications or control such as proportional solenoid valves. The encapsulated circuit board would transfer its heat via thermally conductive encapsulant or encapsulated heat sinks that are directly in contact with the cooling circuit.

The single layer or multilayer circuit board of such an embodiment of the actuator would contain all or part of the following main building blocks: microcontroller, a spool or poppet valve driver, circuit protection, shaft position sensor and I/O connection points in the form of hard mounted connector or flying lead. These building blocks can be generated using discrete components or highly integrated using proprietary ASIC/FPGA technology. The package size of the circuit board fits into machinable areas of 20 mm in diameter to 60 mm in diameter. As shown in FIGS. 17 and 18 it may be installed to the upper cover 802 via screws 844, clips or other retention mechanism commonly used in the industry. Alternatively, the circuitry could be installed in the main housing 308 (see FIG. 4).

The actuator described herein may be referred to as a remote actuator. However, it will be understood that actuator can be remote but that, alternatively, its function and performance can also be built into the actuator or a valve associated with the actuator to reduce packaging and cost.

What is claimed is:

1. A hydraulic rotary actuator, comprising:
a fluid input;
a fluid output;
a main housing comprising a cavity, the cavity comprising a primary chamber and a secondary chamber;
a first cover at least partially covering a first side of the main housing, the first cover comprising a cooling circuit formed in the first cover through which hydraulic fluid flows;
a second cover at least partially covering a second side of the main housing, the second cover comprising a cooling circuit formed in the second cover through which hydraulic fluid flows;
a rotational assembly positioned at least partly within the cavity of the main housing, the rotational assembly comprising:
a hub,
a first vane that moves within the primary chamber in response to hydraulic fluid flowing into the primary chamber to impart rotational motion to the rotational assembly,
a second vane that moves within the secondary chamber in response to hydraulic fluid flowing into the secondary chamber to impart rotational motion to the rotational assembly,
a first manifold providing a fluid connection between the primary chamber and the secondary chamber, the first manifold extending through at least a portion of the first vane and extending through at least a portion of the hub spaced apart from the axis of rotation such that the first manifold does not intersect the axis of rotation, and
a second manifold providing a fluid connection between the secondary chamber and the primary chamber, the second manifold extending through at least a portion of the second vane and extending through at least a portion of the hub spaced apart from the axis of rotation such that the second manifold does not intersect the axis of rotation; and a mechanical connection that connects the rotational assembly to a device to be driven in rotational movement;

wherein the vanes of the rotational assembly are not evenly spaced around the axis of rotation, and wherein the first and second manifolds are not in fluid communication.

2. The hydraulic rotary actuator of claim 1 wherein the first cover cooling circuit is fluidly connected in parallel with a flow of hydraulic fluid through the primary chamber.

3. The hydraulic rotary actuator of claim 2 wherein the second cover cooling circuit is fluidly connected in parallel with the flow of hydraulic fluid through the primary chamber.

4. The hydraulic rotary actuator of claim 3 wherein the first cover cooling circuit and the second cover cooling circuit are fluidly connected in parallel with the flow of hydraulic fluid through the primary chamber.

5. The hydraulic rotary actuator of claim 1 wherein the first cover cooling circuit is fluidly connected in series with a flow of hydraulic fluid through the primary chamber.

6. The hydraulic rotary actuator of claim 5 wherein the second cover cooling circuit is fluidly connected in series with the flow of hydraulic fluid through the primary chamber.

7. The hydraulic rotary actuator of claim 6 wherein the first cover cooling circuit and the second cover cooling circuit are fluidly connected in series with the flow of hydraulic fluid through the primary chamber.

8. The hydraulic rotary actuator of claim 1 wherein the first cover cooling circuit is not fluidly connected with a first flow of hydraulic fluid through the second cover cooling circuit and is not fluidly connected with a second flow of the hydraulic fluid through the primary chamber.

9. The hydraulic rotary actuator of claim 1 wherein the first cover cooling circuit is fluidly connected with a first flow of hydraulic fluid through the second cover cooling circuit, and the first cover cooling circuit and second cover cooling circuits are not fluidly connected with a second flow of hydraulic fluid through the primary chamber.

10. The hydraulic rotary actuator of claim 1 wherein the second cover has a configuration that is symmetrical to the first cover.

11. The hydraulic rotary actuator of claim 1 wherein the first cover and the second cover are cast, forged, billeted or extruded.

12. The hydraulic rotary actuator of claim 11 wherein a mold or die for casting, forging, billeting or extruding the first cover is the mold or die for casting, forging, billeting or extruding the second cover.

13. The hydraulic rotary actuator of claim 12 wherein the first cover is further processed to create an opening to accommodate at least one of a sensor and other control circuitry.

14. The hydraulic rotary actuator of claim 12 wherein the second cover is further processed to create an opening to accommodate a shaft seal.

15. The hydraulic rotary actuator of claim 1 wherein the first cover comprises a cavity.

16. The hydraulic rotary actuator of claim 15 wherein the first cover comprises a sensor positioned at least partially within the cavity.

17. The hydraulic rotary actuator of claim 16 further comprising a cavity cover that at least partially covers the cavity.

18. The hydraulic rotary actuator of claim 17 wherein the cavity cover seals the cavity.

19. The hydraulic rotary actuator of claim 1 wherein the second cover comprises an opening.

20. The hydraulic rotary actuator of claim 19 wherein the mechanical connection comprises a shaft, and the shaft extends through the second cover opening.

21. The hydraulic rotary actuator of claim 20 further comprising a shaft seal, wherein the shaft seal is positioned at least partially within the second cover opening, and the shaft seal seals against an outer surface of the shaft.

22. A hydraulic rotary actuator, comprising:
a fluid input;
a fluid output;
a main housing comprising a cavity, the cavity comprising a primary chamber and a secondary chamber;
a first cover at least partially covering a first side of the main housing, the first cover comprising: a cooling circuit formed in the first cover through which hydraulic fluid flows, a cavity, a sensor positioned at least partially within the cavity, and a cavity cover that seals the cavity;
a second cover at least partially covering a second side of the main housing, the second cover comprising: a cooling circuit formed in the second cover through which hydraulic fluid flows, an opening, and a shaft seal;
a rotational assembly positioned at least partly within the cavity of the main housing, the rotational assembly comprising:
a hub,
a first vane that moves within the primary chamber in response to the hydraulic fluid flowing into the primary chamber to impart rotational motion to the rotational assembly,
a second vane that moves within the secondary chamber in response to the hydraulic fluid flowing into the secondary chamber to impart rotational motion to the rotational assembly,
a first manifold providing a fluid connection between the primary chamber and the secondary chamber, the first manifold extending through at least a portion of the first vane and extending through at least a portion of the hub spaced apart from the axis of rotation such that the first manifold does not intersect the axis of rotation, and
a second manifold providing a fluid connection between the secondary chamber and the primary chamber, the second manifold extending through at least a portion of the second vane and extending through at least a portion of the hub spaced apart from the axis of rotation such that the second manifold does not intersect the axis of rotation; and
a mechanical connection that connects the rotational assembly to a device to be driven in rotational movement, the mechanical connection comprising a shaft;
wherein the vanes of the rotational assembly are not evenly spaced around the axis of rotation, the first and second manifolds are not in fluid communication, and the shaft seal seals against an outer surface of the shaft.

* * * * *

UNITED STATES PATENT AND TRADEMARK OFFICE
CERTIFICATE OF CORRECTION

PATENT NO. : 10,359,061 B2
APPLICATION NO. : 15/890904
DATED : July 23, 2019
INVENTOR(S) : Oswaldo Baasch et al.

It is certified that error appears in the above-identified patent and that said Letters Patent is hereby corrected as shown below:

In the Specification

In Column 1, Line 5, "2014" should be -- 2014, now U.S. Pat. No. 9,897,114, --.

In Column 2, Line 10, "constraints" should be -- constraints. --.

In Column 2, Line 26, "and" should be -- an --.

In Column 3, Line 21, "illustrates" should be -- illustrate --.

In Column 3, Line 54, "multipart" should be -- multiport --.

In Column 4, Lines 16-17, "valve assembly 304." should be -- valve assembly 301. --.

In Column 5, Line 62, "huh." should be -- hub. --.

In Column 6, Line 41, "hut" should be -- but --.

In Column 6, Line 53, "housing 31" should be -- housing 318 --.

In Column 6, Line 59, "rotational assembly 318." should be -- rotational assembly 648. --.

In Column 9, Line 30, "huh" should be -- hub --.

In Column 9, Line 36, "being be cooled" should be -- being cooled --.

In Column 11, Line 45, "single-multipart" should be -- single-multiport --.

In Column 12, Line 25, "housing 308" should be -- housing 304 --.

Signed and Sealed this
Fourteenth Day of April, 2020

Andrei Iancu
*Director of the United States Patent and Trademark Office*